Dec. 2, 1924.

L. D. CULL ET AL 1,517,536

CHAIN LINK CONNECTER

Filed July 14, 1924    2 Sheets-Sheet 1

Dec. 2, 1924.  
L. D. CULL ET AL  
1,517,536  
CHAIN LINK CONNECTER  
Filed July 14, 1924  
2 Sheets-Sheet 2

Patented Dec. 2, 1924.

1,517,536

UNITED STATES PATENT OFFICE.

LOUIS D. CULL AND HUGH T. HUGHES, OF CLEVELAND, OHIO, ASSIGNORS TO THE CLEVELAND CHAIN & MANUFACTURING COMPANY, OF CLEVELAND, OHIO, A CORPORATION OF OHIO.

CHAIN-LINK CONNECTER.

Application filed July 14, 1924. Serial No. 725,826.

*To all whom it may concern:*

Be it known that we, LOUIS D. CULL and HUGH T. HUGHES, citizens of the United States, residing at Cleveland, in the county of Cuyahoga and State of Ohio, have invented certain new and useful Improvements in Chain-Link Connecters, of which the following is a specification.

This invention relates to improvements in chain link connecters, the present embodiments of the invention being particularly designed and adapted for use in connecting the ends of the side chains or members of ordinary "non-skid" chains commonly employed in connection with automobile tires.

The primary object of the invention is to provide a generally improved chain link connecter of this class which will be exceedingly simple in construction, cheap of manufacture, and efficient in use.

A further and very important object is the provision of a link connecter which may be readily attached to the circumferentially extending chains or side members of non-skid chains and when so attached may be readily connected to the links of the adjacent side members thereof to draw the same together in the act of securing the chain about the tire, suitable leverage being provided through the improved fulcrum lever connected to the main or fulcrum connecter link, the latter being provided with a chain link receiving and transferring recess or hook adapted to cooperate with the link engaged portion of the fulcrum lever whereby the latter is adapted to readily transfer the connected link into the link receiving recess or throat of the hook of the fulcrum connecter link when the parts are in their connected position.

A still further and important object is the provision of improved locking means for securing the parts in their chain connecting position, the pivoted lever and locking members being so arranged and disposed relative to each other that the operation of connecting and disconnecting the adjacent side members of a non-skid chain may be quickly effected and in which the liability of the lever or other parts coming open or being disarranged will be reduced to a minimum.

With the above mentioned and other ends in view, the invention consists in the novel construction, arrangement and combination of parts, hereinafter described, illustrated in some of its embodiments in the accompanying drawings, and particularly pointed out in the appended claims.

Figure 1:
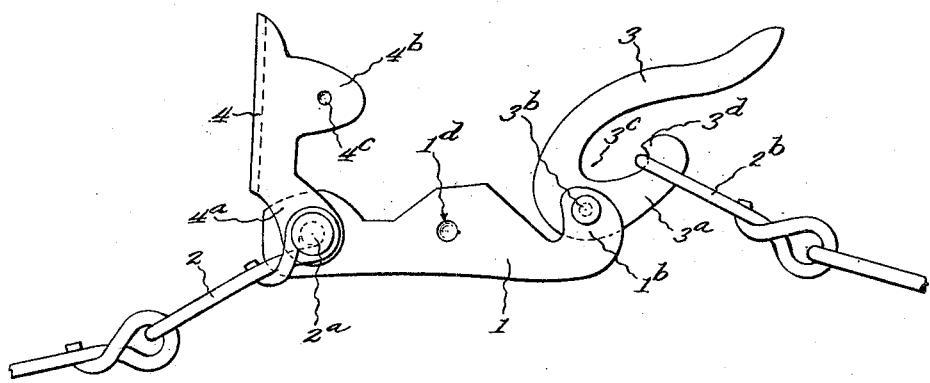

Referring to the drawings, forming a part of this specification, Figure 1 is a side elevation of a chain link connecter, constructed in accordance with this invention, and showing the parts in their open or initial position preparatory to drawing the side chains together and locking the parts in their connected positions.

Figure 2:
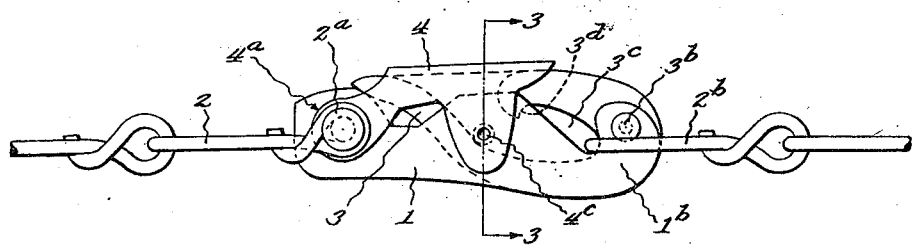

Fig. 2, a similar view showing the connecter parts closed and locked in their connected positions.

Figure 3:
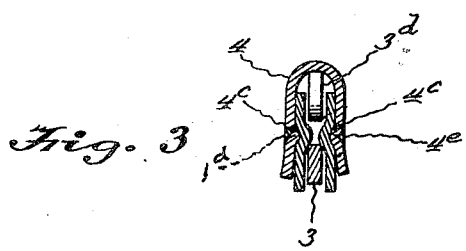

Fig. 3, a cross sectional view, taken on line 3—3 of Fig. 2.

Figure 4:
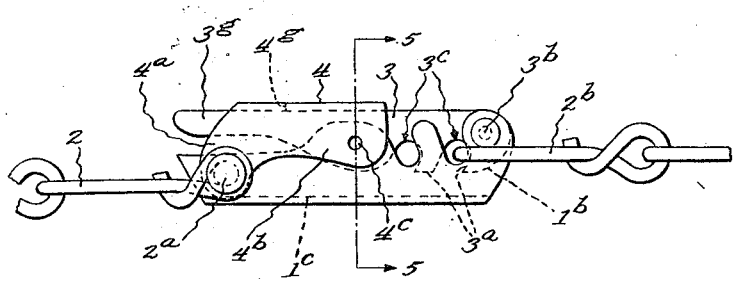

Fig. 4, a side elevation of a modified form, the parts being shown in their connected and locked positions.

Figure 5:
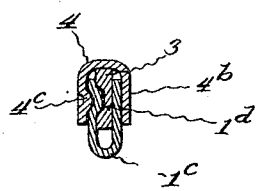

Fig. 5, a cross sectional view of the same, taken on line 5—5 of Fig. 4.

Figure 6:
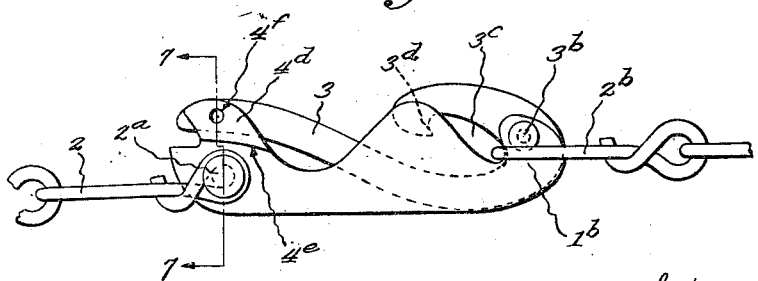

Fig. 6, a side elevation of a further modification, the parts being shown in their connected and locked positions.

Figure 7:
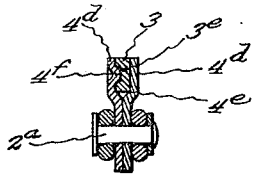

Fig. 7, a cross sectional view of the same, taken on line 7—7 of Fig. 6.

Similar numerals of reference designate like parts throughout all the figures of the drawings.

The improved connecter comprises a main connecter or fulcrum link, provided near one end with a chain link receiving recess $1^a$, preferably formed by means of a relatively fixed hook or projection $1^b$. The opposite end of the connecter link or fulcrum forming member 1 is connected to one of the links 2, of the side chain to be connected, said connection, in the present instance, comprising a headed cross connecting element $2^a$, such as a rivet, or the like.

The connecter or fulcrum link 1 is preferably made up of spaced parallel extending sides, as indicated, and, if desired, may be made up of a single blank of sheet metal crimped or formed longitudinally upon itself, leaving a connected or bottom portion $1^c$, as indicated in Figs. 4 and 5 of the drawings.

As a means of initially engaging the adjacent link $2^a$ of the side chain to be drawn up and connected, one end of the fulcrum link is provided with a chain link receiving and transferring hook $3^a$, pivoted at $3^b$, and formed as a part of a lever 3. In the present instance, the hook 3ª conjointly with the lever 3 forms an intervening link receiving and transferring recess 3ᶜ and, in the present instance, the pivoted hook and lever members are mounted between the spaced sides forming the hook 1ᵇ by means of a pivot or rivet member 3ᵇ. In the form shown in Figs. 1, 2 and 6 of the drawings the hook 3ª is provided with a head or claw portion 3ᵈ, adapted to conveniently engage with the link 2ª, as shown most clearly in Fig. 1 of the drawings, so that when the lever 3 is folded over while within the fulcrum link 1, as shown in Figs. 2 and 6 of the drawings, the chain link 2ª will be transferred into the link receiving recess or seat 1ª of the fulcrum link so that the pulling strains and stresses of the connected side chain will be received solely by the fulcrum link,—the lever 3 and hook 3ª being entirely relieved of strains and stresses when connected.

As a means of securing or locking the parts in their chain connecting positions, and particularly shielding the parts as against being caught or disarranged when connected, one end of the connecter or fulcrum link 1 is provided with a keeper adapted to extend over and interlock with the free end of the lever 3, as now described. In the form shown in Figs. 1 to 5, inclusive, of the drawings, the keeper is in the specific form of a pivoted keeper plate 4 made up, in the present instance, of a longitudinally folded or channelled member forming parallel extending sides with hinge members 4ª, extending over the projecting cross element or bearing member 2ª and between the sides of the connecter link 1 and the ends of the link 2, said keeper plate 4 being provided with wings 4ᵇ, adapted to extend over the sides of the fulcrum link 1 and provided with inwardly extending projections 4ᶜ, adapted to register with and interlock or be seated within the outer recess portions 1ᵈ of the inwardly struck projections or studs in the sides of the connecter link. The studs 1ᵈ are adapted to snap over into engagement with the lever 3 when the latter is in its closed position so that the parts interlock and overlap in a double manner, as shown most clearly in Fig. 3 of the drawings.

If desired, the pivoted form of keeper may be dispensed with and the form shown in Figs. 6 and 7 of the drawings substituted, and in which instance the keeper for engaging the free end of the lever 3 comprises spaced relatively fixed keeper plates or members 4ᵈ, off-set from the sides of the fulcrum or connecter link 1 forming stop shoulder 4ᵉ for limiting the inward movement of the lever 3, one of the keeper plates 4ᵈ being provided with an inwardly struck stud or projection 4ᶠ, to interlock with a corresponding recess 3ᵉ in the free end of the lever.

In the form shown in Figs. 4 and 5 of the drawings the lever 3ᶠ is relatively straight and is provided with an extended portion 3ᵍ, and the pivoted keeper plate 4 is provided with a slot or recess 4ᵍ, to receive and offer clearance for the extended portion 3ᵍ of the lever 3ᶠ as the pivoted keeper plate is moved to and from its respective closed and open positions relative to the lever 3ᶠ. In this form the link receiving and transferring hooks 3ª and recesses or seats 3ᶜ are of relatively short formation and a plurality of such elements are formed in spaced relation and so likewise as to the recesses 1ª and hooks 1ᵇ of the fulcrum link.

Having thus described some of the embodiments of our invention, without having attempted to set forth all the forms in which it may be made, or all the modes of its use, what we claim and desire to secure by Letters Patent is,—

1. In a chain connecter, a fulcrum link having a link receiving recess, a lever pivoted in proximity to the latter and foldable thereover and provided with a link receiving and transferring recess, and means including interlocking projections and recesses for retaining said lever when moved to a closed position.

2. In a chain link connecter, a fulcrum link provided at one end with a chain link receiving recess and a pivoted overlapping lever provided with a link engaging and transferring hook in cooperative relation to said recess, and a pivoted keeper member at the opposite end of said fulcrum link adapted to fold inwardly over the free end of said lever and having resilient projections interlocking with said fulcrum link when closed.

3. In a chain link connecter, a fulcrum link provided at one end with a link receiving hook and a pivoted fulcrum lever provided with a link receiving and transferring hook adapted when folded inwardly by said fulcrum lever to transfer the chain link into the hook portion of said fulcrum link, and a keeper having resilient projections for securing said fulcrum lever in closed position.

4. In a chain link connecter, a fulcrum link provided with a chain link receiving hook portion at one end, a complementary pivoted overlapping hook provided with a fulcrum lever adapted when folded to transfer the chain link into said hook portion of said fulcrum link and to fold within the latter, and a keeper plate at the opposite end of said fulcrum link extending over and interlocking with the free end of said lever when the latter is closed.

5. In a chain link connecter, a fulcrum link having a chain link receiving recess, a lever pivoted at one end thereof near said recess and provided with a chain link receiving and transferring recess and adapted to fold over said fulcrum link and transfer the chain link into said recess of said fulcrum link, and a pivoted keeper plate at the opposite end of said fulcrum link adapted to fold inwardly over the free end of said lever and to having resilient projections interlock with said fulcrum link when closed.

6. In a chain link connecter, a fulcrum link provided at one end with a chain link receiving hook and a pivoted fulcrum lever having an overlapping link receiving hook adapted when open to initially engage the link to be connected and when folded to transfer the link into the hook portion of said fulcrum link and to fold over the latter and close the link receiving hook thereof and an inwardly foldable keeper pivoted on the opposite end of said fulcrum link and adapted to extend over the free end of said fulcrum lever and to having wings with struck-out studs to interlock with said fulcrum link.

7. In a chain link connecter, a fulcrum link made up of parallel extending sides and provided at one end with a link receiving recess and a pivoted inwardly foldable lever extending between the sides of said link, said lever being provided with a link receiving recess adapted when the lever is folded to transfer the link into said link receiving recess of said fulcrum link and to close the latter, said fulcrum link being provided at the opposite end with a keeper having a locking projection and being adapted to receive and interlock with the lever when the latter is folded.

8. In a chain link connecter, a fulcrum connecter link provided at its opposite ends with pivoted lever and keeper members foldable inwardly toward each other over said fulcrum link when closed, said fulcrum link and lever members being provided with link receiving recesses adapted to be brought into registry with each other when the lever is closed, said pivoted keeper member being foldable inwardly over the free end of the lever and being provided with wings and projections extending over the outer sides of said fulcrum link and interlocking with the latter when folded.

9. In a chain link connecter, a fulcrum link provided at one end with a chain link receiving hook and a pivoted fulcrum lever having an overlapping link receiving hook including a claw and adapted when open to initially engage the link to be connected, said hook when folded adapted to transfer the link into the hook portion of said fulcrum link and to fold over and close said link hook and an inwardly foldable keeper of substantially U-shape in cross section adapted to extend over the free end of said fulcrum lever and the outer sides of said fulcrum link and the sides of said keeper having inwardly extending projections interlocking with the outer sides of said fulcrum link.

In testimony whereof we have affixed our signatures.

LOUIS D. CULL.
HUGH T. HUGHES.